(12) United States Patent
Walsh

(10) Patent No.: US 6,221,192 B1
(45) Date of Patent: Apr. 24, 2001

(54) METHOD FOR AND APPARATUS FOR USE IN FORMING CARTON BLANKS

(75) Inventor: Joseph C. Walsh, Boulder, CO (US)

(73) Assignee: Coors Brewing Company, Golden, CO (US)

(*) Notice: Subject to any disclaimer, the term of this patent is extended or adjusted under 35 U.S.C. 154(b) by 0 days.

(21) Appl. No.: 09/291,360

(22) Filed: Apr. 14, 1999

Related U.S. Application Data

(63) Continuation-in-part of application No. 09/165,654, filed on Oct. 3, 1998, which is a continuation-in-part of application No. 09/548,191, filed on Oct. 25, 1995, now abandoned.

(51) Int. Cl.[7] .............................. B32B 31/00; E04D 1/12
(52) U.S. Cl. .......................... 156/257; 156/252; 156/268; 156/270; 156/516; 156/547; 156/517; 156/555; 493/60; 493/64; 493/132; 493/160; 493/63; 493/97; 493/110; 493/147; 493/150; 229/185.1; 229/800
(58) Field of Search ........................ 156/516, 555, 156/547, 257, 268, 252, 270; 229/185.1, 800; 493/60, 64, 132, 160, 63, 97, 110, 147, 150

(56) References Cited

U.S. PATENT DOCUMENTS

| | | | |
|---|---|---|---|
| 2,363,425 | 11/1944 | Klein | 493/56 |
| 3,942,708 | 3/1976 | Christensson | 229/5.82 |
| 5,632,404 | 5/1997 | Walsh | 229/5.81 |

*Primary Examiner*—Linda L. Gray
(74) *Attorney, Agent, or Firm*—Klaas, Law, O'Meara & Malkin, P.C.; William P. O'Meara, Esq.; Nellie C. Kaufman, Esq.

(57) ABSTRACT

Individual carton blanks formed from a lamination of a continuous strip of a relatively rigid material and a relatively flexible fluid impervious material and in some instances from spaced apart continuous strips of a relatively flexible material wherein all of the cut and fold lines are formed in the continuous strip of a relatively rigid material and then conveyed to the nip between two rotating laminating rolls where all of the continuous strips are secured together by an adhesive at desired locations. In some instances, the continuous strip of a relatively flexible fluid impervious material and the spaced apart continuous strips of a relatively flexible material are cut at a location spaced from the leading edge of the individual carton blanks.

19 Claims, 7 Drawing Sheets

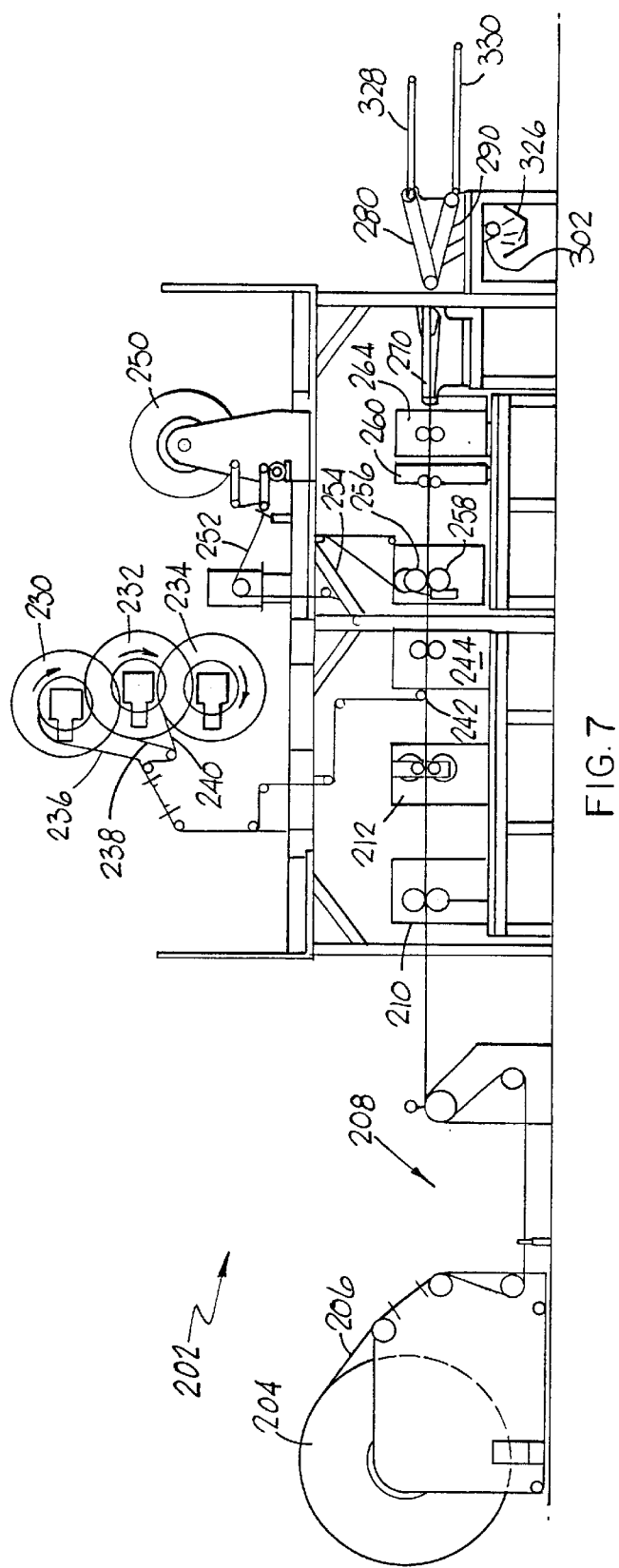
FIG. 7
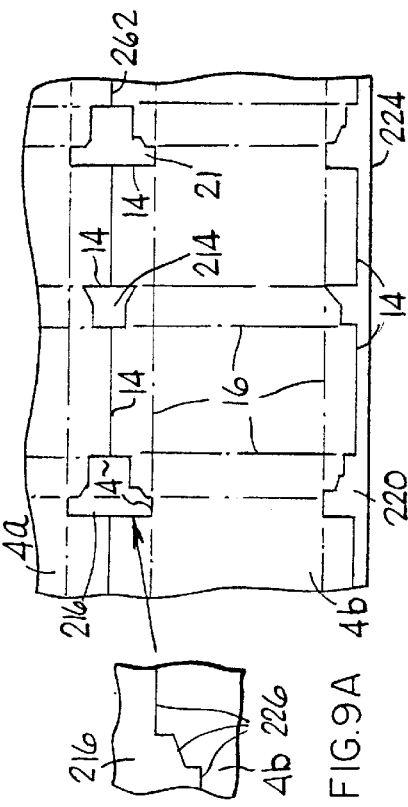
FIG. 9
FIG. 9A
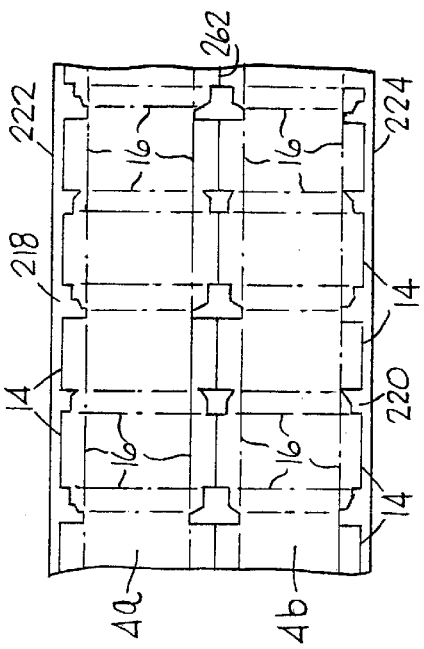
FIG. 8

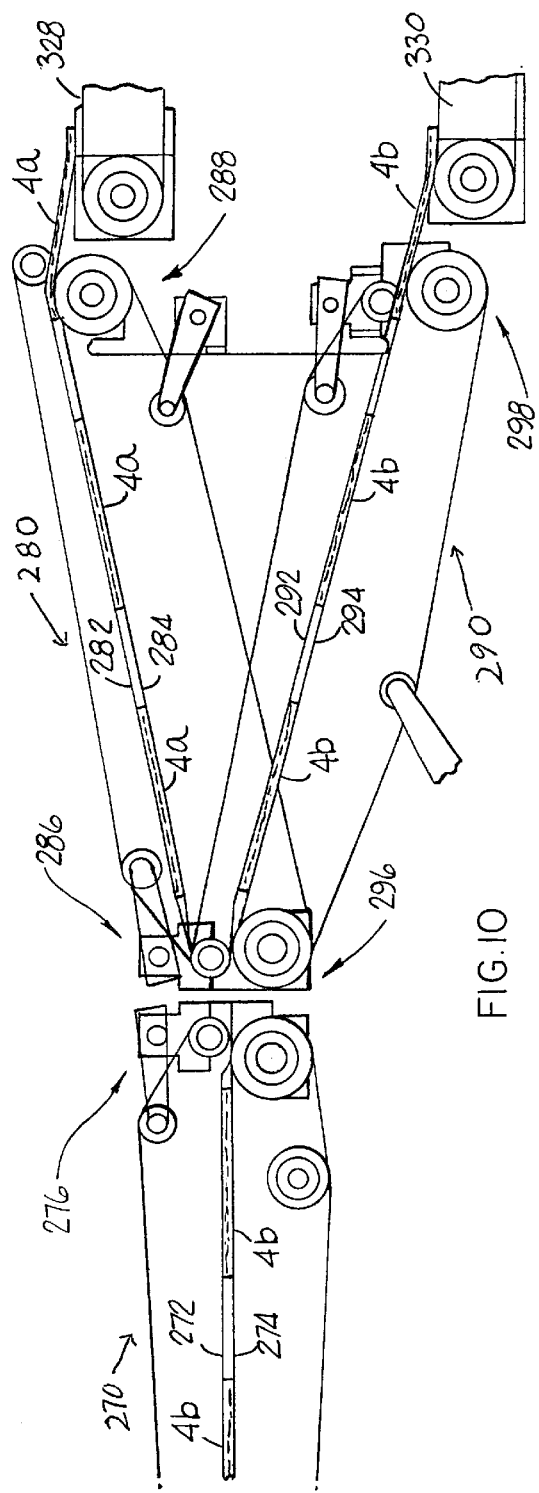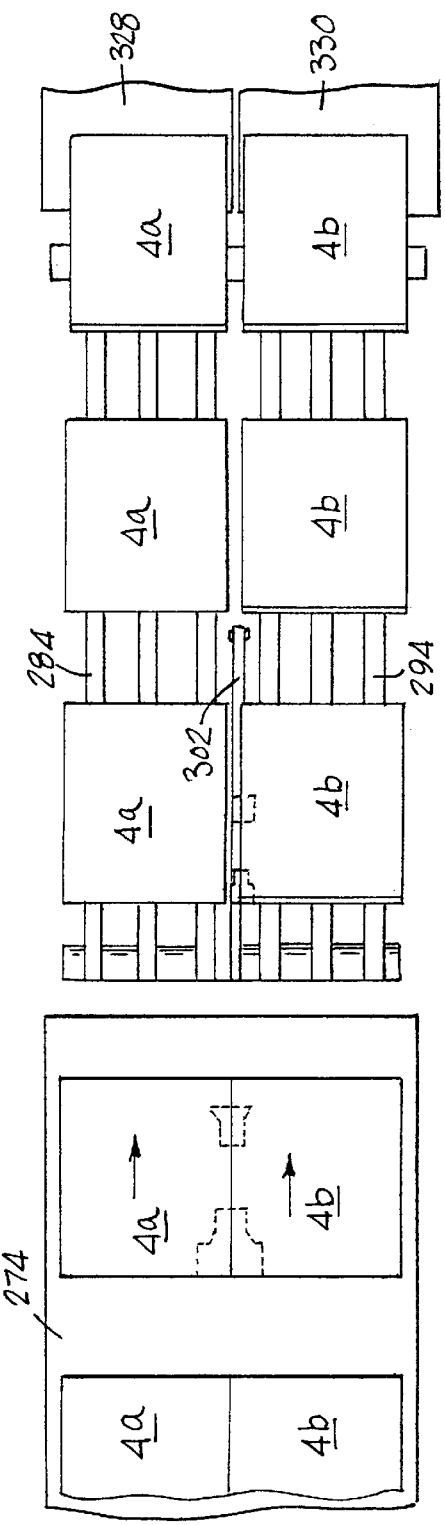

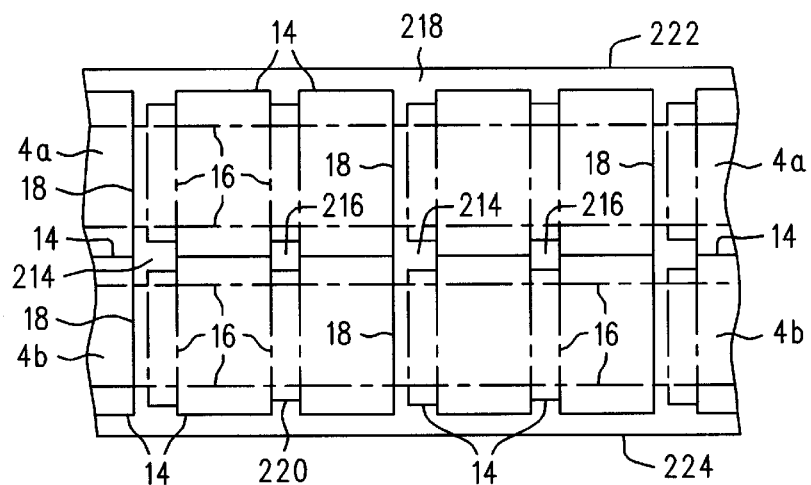
FIG. 17
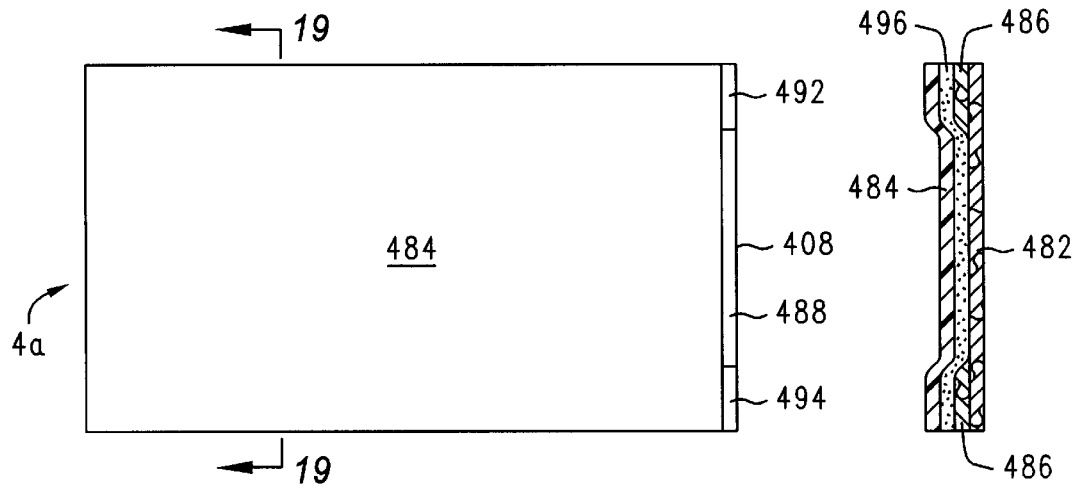
FIG. 18   FIG. 19
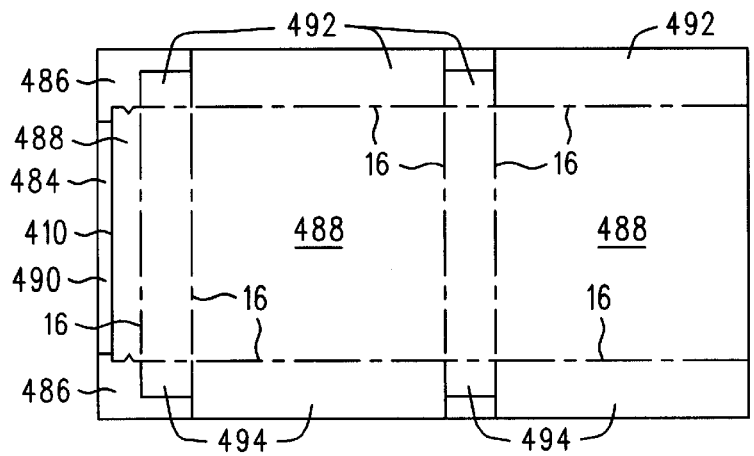 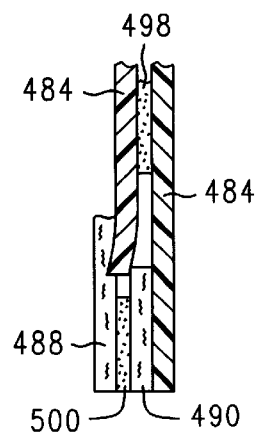
FIG. 20   FIG. 21

METHOD FOR AND APPARATUS FOR USE IN FORMING CARTON BLANKS

FIELD OF THE INVENTION

This application is a Continuation-In-Part application of U.S. patent application Ser. No. 09/165,654 filed Oct. 3, 1998 for Apparatus For Use In Forming Carton Blanks which application is a Continuation-In-Part application of U.S. patent application Ser. No. 08/548,191 filed Oct. 25, 1995 now abandoned which applications are incorporated herein by reference thereto.

BACKGROUND OF THE INVENTION

In some processes for forming carton blanks, apparatus is used to laminate together a continuous strip of a relatively rigid material and a continuous strip of a relatively flexible material. Under some operating conditions, there is a tendency for the laminated materials to curl. The operating conditions relate to the type of adhesive being used and the manner in which the continuous strip of a relatively rigid material and the continuous strip of a relatively flexible material are fed into the nip between the laminating rolls. In the curled product, an arcuate shape extending in the machine direction is formed between the ends of the carton blank wherein the inner surface of the arcuate shape comprises the relatively flexible material. Under these conditions, the adhesive being used is a liquid adhesive that is tacky at room temperatures which under desirable operating conditions is between 60° F. and 80° F. but could be as high as 110° F. However, as the temperature approaches 110° F., the liquid adhesive does not perform as well. Also, under these conditions, the continuous strip of a relatively rigid material and the continuous strip of a relatively flexible material are fed from opposite sides of a plane tangent to the laminating rolls at the nip therebetween or at least one of the continuous strips is in the plane tangent to the laminating rolls at the nip therebetween. In most instances, the amount of curl is slight but can interfere with further processing of the carton blanks. Many types of liquid adhesives were tried in an effort to eliminate the curl. Therefore, it is desirable to eliminate or at least to minimize the amount of curl.

In conventional apparatus for forming carton blanks, a laminate of desired materials is made and then appropriate cut lines and fold lines are formed in the laminate. Also, the individual carton blanks may be formed at the same time or formed in a separate operation.

In U.S. Pat. No. 3,942,708 there is disclosed a process wherein individual carton blanks of a relatively rigid material are fed onto a moving continuous strip of a relatively flexible material. It is stated that an adhesive material is applied either on the continuous strip of a relatively flexible material or on the individual carton blanks. It is further stated that the individual carton blanks are formed in a separate operation. There is no illustration or explanation of any apparatus for feeding the individual punched carton blanks onto the continuous strip of a relatively flexible material. After being deposited on the continuous strip of a relatively flexible material, each individual carton blank and the continuous strip of a relatively flexible material are pressed together by suitable apparatus.

BRIEF DESCRIPTION OF THE INVENTION

This invention provides apparatus for laminating together a continuous strip of a relatively rigid material and a continuous strip of a relatively flexible, fluid impervious material so as to prevent or minimize the curling of the lamination. In some instances, the laminate includes spaced apart relatively narrow continuous strips of a relatively flexible material. Also, the invention provides for the formation of the cut and fold lines in the continuous strip of a relatively rigid material prior to the lamination thereof to the continuous strip of a relatively flexible, fluid impervious material.

In one preferred embodiment of the invention, the apparatus comprises conventional laminating rolls each having a diameter between about 8 and 12 inches and preferably about 10 inches and comprising a first roll mounted at a fixed location for rotational movement and a second rotatable roll mounted adjacent to the first roll so as to form a nip therebetween and for movement toward or away from the first roll and urged by gravity or mechanical means toward the first roll. Drive means are provided for rotating at least one or both of the first and second rolls. At least a first guide apparatus is located to guide a continuous strip of a relatively rigid material into the nip. At least a second guide apparatus is located to guide a continuous strip of a relatively flexible material, preferably a fluid impervious material, into the nip so that the continuous strip of a relatively rigid material and the continuous strip of a relatively flexible, fluid impervious material have facing surfaces. While the guide apparatus is illustrated as rolls, it is understood that it can be of other configurations. An adhesive coating comprising a liquid adhesive, that is tacky at temperatures between about 60° F. and 110° F., is applied to at least portions of at least one of the facing surfaces. The portions of the adhesive coating are located so that a plurality of spaced apart strips of the relatively rigid material and the relatively flexible fluid impervious material are not secured together. Preferably, the portions of the adhesive coating are on the facing surface of the continuous strip of a relatively flexible fluid impervious material. The at least a first guide apparatus and the at least a second guide apparatus are located so that the continuous strip of a relatively rigid material and the continuous strip of a relatively flexible material enter the nip only from one side of a plane tangent to the first roll and the second roll at the nip to secure at least portions of the continuous strips together. The first and second guide apparatus are located so that the continuous strip of a relatively rigid material contacts the first roll before the continuous strip of a relatively flexible fluid impervious material contacts the continuous strip of a relatively rigid material. Alternatively, the first and second guide apparatus may be located so that the continuous strip of a relatively rigid material contacts the second roll before the continuous strip of a relatively flexible fluid impervious material contacts the continuous strip of a relatively rigid material. Preferably, the second guide apparatus is located so that the portion of the continuous strip of a relatively flexible fluid impervious material contacts the portion of the continuous strip of a relatively rigid material at a location spaced about one inch from the nip between the laminating rolls.

In another preferred embodiment of the invention, rotary cutting and creasing rolls are located before the first and second rolls for forming cut lines and fold lines in the continuous strip of a relatively rigid material. The rotary cutting and creasing rolls are driven at substantially the same rate of speed as the first and second laminating rolls. While the rotary cutting and creasing rolls exert a pulling force on the continuous strip of a relatively rigid material, the primary pulling force is exerted by the first and second laminating rolls. Some cut lines, preferably at least one cut line, necessary for the formation of individual carton blanks are not made in the continuous strip of a relatively rigid material to retain the continuity of the continuous strip of a relatively rigid material after it leaves the cutting and creasing apparatus so that the continuous strip of a relatively rigid material having the some cut lines formed therein may be pulled through the laminating rolls. If the continuous strips have a sufficient extent in a cross-machine direction so that two carton blanks are formed at the same time, the continuous strip of a relatively rigid material is preferably appropriately cut by the rotary cutting and creasing rolls and the laminated materials are passed between a first pair of cutting rolls which cut the continuous strip of a relatively flexible fluid impervious material located between the individual carton blanks to be formed. The laminated materials then pass through a second pair of cutting rolls where the cut lines not previously made are made to form a plurality of at least two individual carton blanks which are then deposited on a first moving conveyor and further processed as described below.

In another embodiment of the invention, at least a third guide apparatus is provided to guide a plurality of spaced apart, relatively narrow continuous strips of a relatively flexible material into the nip. The third guide apparatus is located so that the plurality of spaced apart, relatively narrow continuous strips of a flexible material are located between the continuous strip of a relatively rigid material and the continuous strip of a relatively flexible material. At least other portions of an adhesive coating are located to secure the plurality of spaced apart, relatively narrow continuous strips of a relatively flexible material to portions of the continuous strip of a relatively flexible, fluid impervious material but not to the continuous strip of a relatively rigid material. In preferred embodiments of the invention, the continuous strip of a relatively rigid material comprises a composite material, as described below, each of the plurality of spaced apart, relatively narrow continuous strips of a relatively flexible material comprises paper, such as clay coated recycled Kraft paper, and the continuous strip of a relatively flexible, fluid impervious material comprises a plastic film, such as polypropylene.

If the continuous strips of the relatively rigid material and of the relatively flexible fluid impervious material are sufficiently wide to form two carton blanks, the plurality of continuous strips of a relatively flexible material are three in number with the center strip being twice as wide as the end strips. In this embodiment, the rotary cutting and creasing rolls and the first and second pair of cutting rolls function as described above. In addition to cutting the continuous strip of a relatively flexible fluid impervious material, the first pair of cutting rolls also cuts the center continuous strip of the relatively narrow continuous strips of a relatively flexible material.

Collecting apparatus is provided to form the individual carton blanks into one or more vertical stacks. The individual carton blanks are placed on the one vertical or more stacks so that the relatively flexible, fluid impervious material faces upwardly. Other types of collecting apparatus may be used such as that described below.

In some instances, depending on the thickness and quality of the continuous strip of a relatively rigid material, the cutting and creasing rolls do not remove the scrap material. In those instances, rolls located after the laminating apparatus remove the scrap material.

When two carton blanks are being formed at the same time from the laminated materials, it is necessary to remove the scrap material located between the two carton blanks. This scrap material results from the formation of the necessary middle cut lines for the individual carton blanks. Scrap removing apparatus is provided for removing the scrap material and, in a preferred embodiment of the invention, comprises a first moving conveyor having one end portion located adjacent to the second pair of cutting rolls and having a reach for receiving in succession a plurality of the at least two individual carton blanks leaving the second pair of cutting rolls. The first moving conveyor moves at a velocity so that the plurality of at least two individual carton blanks are in a spaced apart relationship on a reach thereof which reach lies generally in a horizontal plane. A second moving conveyor has one end portion located adjacent to the other end portion of the first moving conveyor and has a reach for receiving one of the at least two individual carton blanks. The second moving conveyor moves at a velocity substantially equal to the velocity of the first moving conveyor and the reach of the second moving conveyor lies in a plane inclined upwardly from the horizontal plane. A third moving conveyor has one end portion located adjacent to the other end portion of the first moving conveyor and has a reach for receiving the other of the at least two individual carton blanks. The third moving conveyor moves at a velocity substantially equal to the velocity of the first moving conveyor and the reach of the third moving conveyor lies in a plane inclined downwardly from the horizontal plane. The scrap material is completely cut from one of the at least two individual carton blanks and removably secured to the other of the at least two individual carton blanks. Therefore, the scrap materials move downwardly with the other of the at least two individual carton blanks. Portions of the scrap materials project outwardly from one edge of the other of the at least two individual carton blanks. Force applying apparatus is provided for applying sufficient force to the portion of the scrap materials projecting outwardly from the other of the at least two individual carton blanks to remove the scrap materials from the other of the at least two individual carton blanks.

In a preferred embodiment of the invention, the force applying apparatus comprises a fourth moving conveyor having a reach having at least a portion thereof located adjacent to at least a portion of the reach of the third moving conveyor with the at least a portion of the reach of the fourth moving conveyor moving in the same plane as the adjacent portion of the third moving conveyor. A fifth moving conveyor has a reach having a portion facing the at least a portion of the reach of the fourth moving conveyor and in contact therewith. The portions of the scrap materials projecting outwardly from the other of the at least two individual carton blanks are guided into contact with the contacting portions of the fourth and fifth moving conveyors. The contacting portions of the reaches of the fourth and fifth moving conveyors move between rollers so that the fourth and fifth moving conveyors move in a plane inclined downwardly from the plane of the reach of the third moving conveyor to remove the portions of scrap materials and to convey the removed portions of scrap materials to a scrap disposal location.

In another embodiment of the invention the cutting and creasing apparatus forms all of the cut and fold lines in the continuous strip of a relatively rigid material that are necessary to form a plurality of individual carton blanks. The plurality of individual carton blanks and remaining portions of the continuous strip of a relatively rigid material are connected together by readily frangible small notches of the relatively rigid material. While these readily frangible small notches are of sufficient strength to hold the plurality of individual carton blanks and the remaining portions of the relatively rigid material in a desired relationship, the readily frangible small notches are not of sufficient strength to withstand the pulling force exerted by the laminating rolls without additional support. In accordance with this invention, the plurality of individual carton blanks and the remaining portions of the relatively rigid material move from the rotary cutting and creasing apparatus onto a moving conveyor that has holding apparatus for holding the plurality of individual carton blanks and the remaining portions of the relatively rigid material in the desired relationship. In a preferred embodiment of the invention, the moving conveyor comprises a perforated conveyor belt that is moved over a vacuum source of sufficient strength to hold the plurality of individual carton blanks on the moving conveyor with each of the plurality of individual carton blanks having a leading edge and a trailing edge and an exposed surface. Each of the plurality of individual carton blanks has a central body portion, as described below. The moving vacuum conveyor passes through an adhesive applying apparatus wherein an adhesive coating is applied to at least portions of each central body portion. After passing through the adhesive coating apparatus, the moving vacuum conveyor moves the plurality of individual carton blanks into the nip between the two rotating laminating rolls, described above. A continuous strip of a relatively flexible fluid impervious material is pulled from a supply roll preferably by the two rotating laminating rolls, and is guided by suitable apparatus into a superposed relationship to the adhesive coated plurality of individual carton blanks to move with them into the nip between the two laminating rolls so that a central portion of the continuous strip of a relatively flexible fluid impervious material is secured to the adhesive coated portions of the central body portions of the plurality of individual carton blanks.

The laminated product is then passed through a cutting apparatus, preferably a rotary cutting apparatus, to cut only the continuous strip of the relatively flexible fluid impervious material. The movements of the various portions of the apparatus are controlled by conventional apparatus so that the continuous strip of a relatively flexible fluid impervious material is cut either at a location directly above the leading edge of an individual carton blank or at a location spaced from the leading edge. If the cut is made at the location spaced from the leading edge, when adjacent carton blanks in the machine direction are separated, portions of one of the sidewall, top and bottom panels adjacent the leading edge are exposed and portions of the continuous strip of a relatively flexible fluid impervious material extend rearwardly from the trailing edge of each of the plurality of individual carton blanks.

In another preferred embodiment of the invention, a plurality of spaced apart continuous strips of a relatively flexible material are pulled from supply rolls by the laminating rolls and guided by suitable guiding apparatus into a superposed relationship with the plurality of individual carton blanks on the moving vacuum conveyor belt prior to passing through the adhesive applying apparatus. As the plurality of spaced continuous strips of a relatively flexible material pass through the adhesive applying apparatus, portions thereof are coated with an adhesive material so that, when these portions pass through the two rotating laminating rolls, they are also secured to spaced apart portions of the continuous strip of a relatively flexible fluid impervious material.

As described above, the laminated product is then passed through a cutting apparatus, preferably a rotary cutting apparatus to cut only the continuous strip of a relatively flexible fluid impervious material and the plurality of spaced apart continuous strips of a relatively flexible material. As described above, the cut is made either at a location directly above the leading edge or at a locating spaced from the leading edge. If the cut is made at the location spaced from the leading edge, when adjacent carton blanks in the machine direction are separated, portions of one of the sidewall, top and bottom panels adjacent the leading edge are exposed and portions of the continuous strip of a relatively flexible fluid impervious material and of the plurality of spaced apart continuous strips of a relatively flexible material extend rearwardly from the trailing edge of each of the plurality of individual carton blanks.

As described above, the continuous strip of a relatively rigid material and the continuous strip of a relatively flexible fluid impervious material may have a cross machine dimension that will permit the formation of two or more carton blanks in the cross machine direction. In this embodiment, the inner spaced apart continuous strip or strips of a relatively flexible material will have a cross machine dimension that is twice as great as the cross machine direction dimension of the outer spaced apart continuous strips of a relatively flexible material.

BRIEF DESCRIPTION OF THE DRAWINGS

Illustrative and preferred embodiments of the invention are illustrated in the drawing in which:

FIG. 7 is a schematic side elevational view of another embodiment of apparatus of this invention;

FIG. 8 is a bottom plan view of a continuous strip of a relatively rigid material after passing through the rotary cutting and creasing apparatus of FIG. 7;

FIG. 9 is an enlarged portion of FIG. 8;

FIG. 9A is an enlarged portion of FIG. 9;

FIG. 10 is an enlarged portion of FIG. 7 with parts removed;

FIG. 11 is a top plan view of FIG. 10;

FIG. 17 is a top plan view of the continuous strip of the relatively rigid material after it has passed through the rotary cutting and creasing apparatus;

FIG. 18 is a top plan view of the inner portion of a carton blank of this invention;

FIG. 19 is an enlarged cross sectional view taking on the line 19—19 of FIG. 18;

FIG. 20 is a bottom plan view of the carton blank of FIG. 18; and

FIG. 21 is a cross sectional view of a joint formed from the carton blank of FIGS. 18–20.

In FIG. 1, there is illustrated apparatus 2 for making individual carton blanks 4. A continuous strip of a relatively rigid material 6 from a roll of such material (not shown) is moved around guide roll 8 into the nip between cutting and creasing rolls 10 and 12 which are rotated in the direction of the arrows by conventional means (not shown). The relatively rigid material comprises a conventional paperboard or a composite material such as that described in U.S. Pat. No. 4,254,173 dated Mar. 31, 1981 and issued to Peer, Jr. or other materials having similar characteristics. The cutting and creasing rolls 10 and 12 make the cut lines 14 and fold lines 16 in the continuous strip of a relatively rigid material 6. The cut and fold lines 14 and 16 define individual carton blank of the type described in U.S. Pat. No. 5,632,404, which is incorporated herein by reference thereto, wherein each individual carton blank has a plurality of sidewall panels, a glue tab panel, and top and bottom panels extending outwardly in opposite directions from the sidewall panels and joined thereto by fold lines and wherein the inner surfaces of the sidewall panels and the glue tab panel have a central body portion that is located between and spaced from the fold lines between the sidewall panels and the top and bottom panels and extending into the glue tab panel. The cut lines 18, illustrated in FIG. 3 as phantom lines, between the glue tab 20 of one carton blank and the side panel 22 of the preceding carton blank are not made at this time so that the cut and creased continuous strip of a relatively rigid material 6a can be pulled through the laminating operations as described below. Scrap material 24 is deposited from the cutting and creasing roll 10 into a hopper 26.

Figure 1:
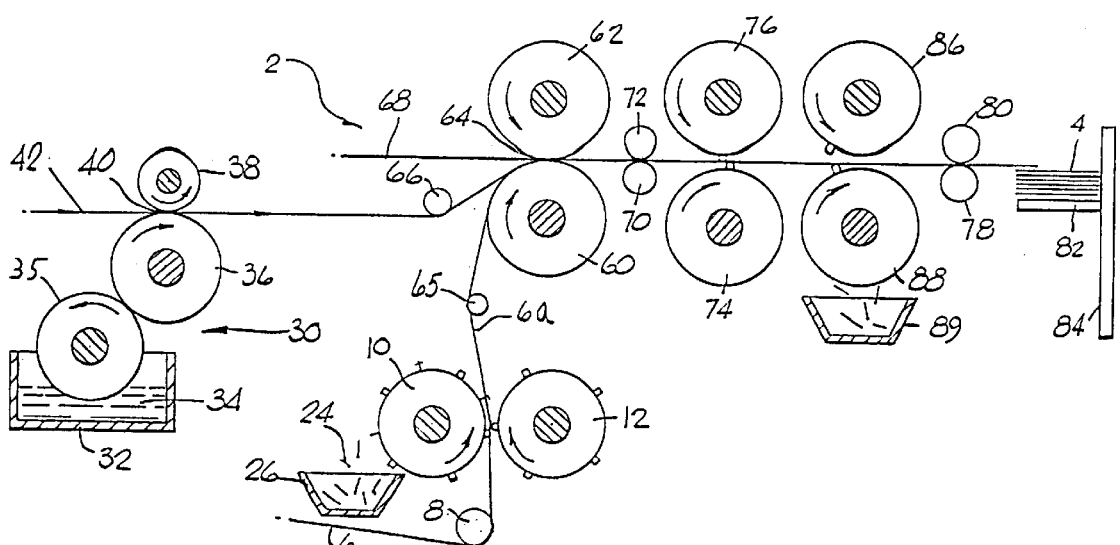
FIG. 1 is a schematic illustration of one embodiment of the invention.

Coating apparatus 30 is mounted at a fixed location. The coating apparatus 30 has a tank 32 for holding a supply of adhesive coating material 34. A rotatable transfer roll 35 is mounted so as to move into contact with the supply of the adhesive coating material 34. A driven gravure roll 36 is mounted so that raised portions thereof (not shown) will contact the transfer roll 35 to have adhesive coating material 34 transferred to the raised portion of the gravure roll 36. The adhesive coating material preferably comprises a liquid adhesive that is tacky at temperatures between about 60° F. and 110° F. As the temperature nears 110° F., the liquid adhesive becomes less effective. The liquid adhesive may be chosen from any of the variety of such liquid adhesives currently on the market. The gravure roll 36 is driven by conventional means (not shown). An idler roll 38 is mounted to form a nip between it and the gravure roll 36 and to apply pressure on the gravure roll 36. A continuous strip of a relatively flexible, fluid impervious material 42 is pulled from a roll of such material (not shown) and passes through the nip 40 and has the adhesive coating material on the gravure roll 36 deposited thereon. The continuous sheet of a relatively flexible, fluid impervious material 42 may comprise a plastic material such as polypropylene, a paper material coated with a plastic material, such as polyethylene, or other materials having similar characteristics. The pattern of the adhesive coating material may be varied. In this instance, the pattern of the raised portions of the gravure roll 36 comprises two spaced apart circumferentially extending raised portions to produce the laminated product illustrated in FIG. 6. This product comprises the relatively flexible, fluid impervious material 42 secured to the relatively rigid material 6 by two spaced apart strips 44 of adhesive so that no adhesive is at the end portions 46 and 48 and the central portion 50. The central portion 50 is twice as wide as the end portions 46 and 48 so that the product illustrated in FIG. 6 may be severed to provide two individual carton blanks 4.

Figure 3:
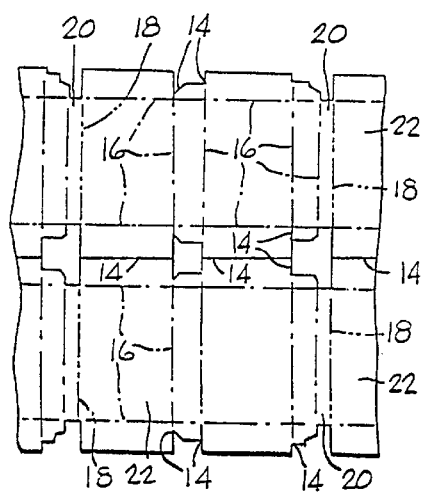
FIG. 3 is a bottom plan view of a continuous strip of a relatively rigid material having cut and fold lines prior to lamination.

It is understood that the continuous strip of a relatively rigid material 6 of FIG. 3 can be of differing shapes and have differing cut and fold line arrangements. Also, other conventional methods and materials can be used to secure together the continuous strip of a relatively rigid material and the continuous strip of a relatively flexible material.

A conventional laminating apparatus is illustrated in FIG. 1 and comprises a first roll 60 and a second roll 62 mounted to form a nip 64. Each of the rolls 60 and 62 preferably has a diameter of about ten (10) inches. Either one or both of the first and second rolls 60 and 62 may be driven by conventional means (not shown) and either one or both may be provided with a flexible surface (not shown). The first and second rolls 60 and 62 function to provide the primary force to pull the continuous strip of a relatively rigid material 6a through the cutting and creasing rolls 10 and 12 and the continuous strip of a relatively flexible fluid impervious material 42 through the gravure roll 36 and idler roll 38 and through the laminating rolls 60 and 62 to form the laminate. While the rotating cutting and creasing rolls 10 and 12 exert some pulling force on the continuous strip 6 of a relatively rigid material and the rotating gravure roll 36 and idler roll 38 exert some pulling force on the continuous strip 42 of a relatively flexible fluid impervious material, the primary pulling force exerted on the continuous strips 6 or 6a and 42 is by the first and second laminating rolls 60 and 62. The laminating rolls 60 and 62 are rotated so that the continuous strip 6a and the continuous strip 42 move through the nip 64 at a velocity between about 700 to 1000 feet per minute. Guide apparatus 65 is located so that the cut and creased continuous strip of a relatively rigid material 6a moves into contact with the first roll 60. Guide apparatus 66 is located to guide the continuous strip of a relatively flexible, fluid impervious material 42 so that the facing surfaces of the cut and creased continuous strip of a relatively rigid material 6a and the continuous strip of a relatively flexible, fluid impervious material 42 move into a contacting relationship. As illustrated in FIG. 1, the invention provides that the cut and creased continuous strip 6a of a relatively rigid material contacts the first roll 60 and then the continuous strip 42 of a relatively flexible fluid impervious material contacts the cut and creased continuous strip 6a of a relatively rigid material. The relationship insures that the continuous strip 6 of a relatively rigid material and the continuous strip 42 of a relatively flexible fluid impervious material enter the nip 64 only from one side of a plane tangent to the laminating first and second rolls 60 and 62 at the nip 64. Preferably, the continuous strip 42 of a relatively flexible fluid impervious material contacts the portion of the continuous strip 6 of a relatively rigid material on one of the rolls 60 and 62 at a location spaced about one inch from the nip 64 when the first and second rolls 60 and 62 each have a diameter of about ten inches.

It is understood that the adhesive coating material may be applied to the continuous strip of a relatively rigid material. In such an embodiment, the apparatus is arranged so that the continuous strip of a relatively rigid material contacts the surface of the first or second roll and then the continuous strip of a relatively flexible, fluid impervious material is superposed over the continuous strip of a relatively rigid material. Also, the continuous strip of a relatively rigid material and the continuous strip of a relatively flexible material enter the nip only from one side of a plane tangent to the first and second rolls at the nip.

It is understood that the cut and fold lines can be formed after the lamination has been made in a conventional manner as long as the continuous strip of a relatively rigid material and the continuous strip of a relatively flexible material enter the nip as described above to eliminate the curling problem.

The laminated product then moves between cutting rolls 70 and 72 which cuts the continuous strip of a relatively flexible, fluid impervious material in the machine direction at the central portion 50 to form two laminated products which then pass between cutting rolls 74 and 76 which make the cut lines 18 between the glue tab 20 of one carton blank and the side panel 22 of the preceding carton blank. After being cut, the carton blanks 4 are fed by feed rolls 78 and 80 into stacking apparatus which is schematically illustrated as a vertically moveable platform 82 which is mounted for movement over support means 84. The laminated product is moved through the cutting rolls 70, 72, 74 and 76 to the feed rolls 78 and 80 in a conventional manner. The upper surface of the carton blanks 4 stacked on the platform 82 comprises the relatively flexible, fluid impervious material 42. There can be more than one stacking apparatus.

In some instances, depending on the thickness and quality of the continuous strip of a relatively rigid material 6, the cutting and creasing rolls 10 and 12 do not remove the cut scrap material 24. In those instances, rolls 86 and 88 remove the cut scrap material 24 and deposit It into a hopper 89.

Figure 2:
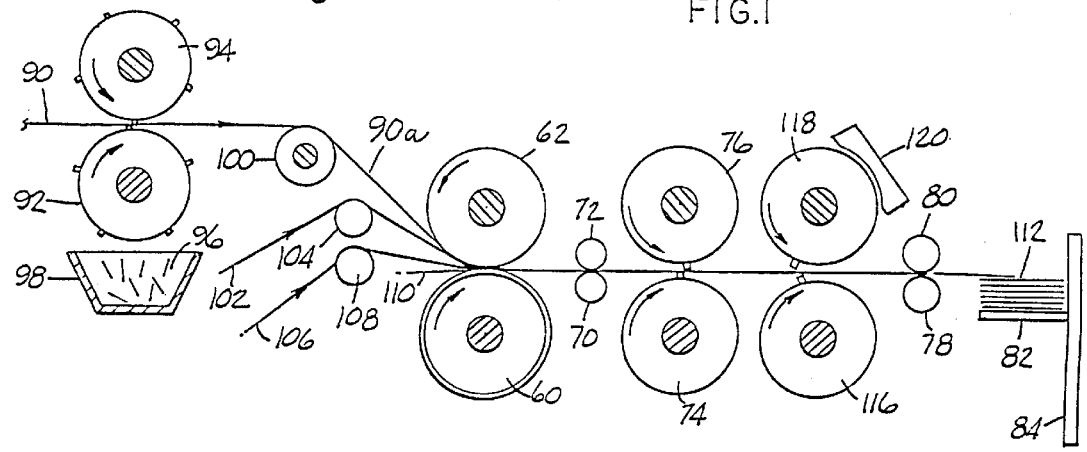
FIG. 2 is a schematic illustration of another embodiment of the invention.

Another preferred embodiment of the invention is illustrated in FIG. 2 wherein a continuous strip of a relatively rigid material 90 moves into the nip between cutting and creasing rolls 92 and 94 which are rotated in the direction of the arrows by conventional means (not shown) to form the product described above and illustrated in FIG. 3. Scrap material 96 is deposited from the cutting and creasing roll 92 into the hopper 98. The continuous strip of a relatively rigid material 90 is similar to the continuous strip of a relatively rigid material 6. It is understood that carton blanks differing from the carton blanks of FIG. 3 may be made by changing the configuration of the cutting and creasing means on the cutting and creasing rolls 10, 12, 92 and 94.

The portions of the laminating, cutting and stacking apparatus of FIG. 2 corresponding to similar portions of the laminating, cutting and stacking apparatus of FIG. 1 have been given the same reference numerals. After passing through the cutting and creasing rolls 92 and 94, the continuous strip of a relatively rigid material 90 moves over guide apparatus 100 into contact with the second roll 62. A plurality of spaced apart, relatively narrow continuous strips of a relatively flexible material 102 are pulled from rolls of such material (not shown) and move over guide apparatus 104 so that facing surfaces of the continuous strip of a relatively rigid material 90 and the plurality of spaced apart, relatively narrow continuous strips of a relatively flexible material 102 move into a contacting relationship. A continuous strip of a relatively flexible, fluid impervious material 106, which has been provided with an adhesive coating by coating apparatus (not shown), similar to coating apparatus 30 but having a different pattern, moves over apparatus 108 so that a facing surface thereof moves into contacting relationship with the facing surfaces of the plurality of spaced apart, relatively narrow continuous strips of a relatively flexible material 104 and the portions of the facing surface of the continuous strip of the relatively rigid material 90 not in contact with the facing surfaces of the plurality of spaced apart, relatively narrow continuous strips of the relatively flexible material 104 to form a laminate described more fully below. The apparatus 100, 104 and 108 are located so that the continuous strip of a relatively rigid material 90, the plurality of spaced apart, relatively narrow continuous strips of a relatively flexible material 102 and the continuous strip of a relatively flexible, fluid impervious material 106 enter the nip 64 only from one side of a plane 110 tangent to the first and second rolls 60 and 62 at the nip 64. As illustrated in FIG. 2, the invention provides that the cut and creased continuous strip 90a of a relatively rigid material contacts the second roll 62 and then the plurality of continuous strips 102 of a relatively flexible material contacts the cut and creased continuous strip 90a and then the continuous strip 106 of a relatively flexible material contacts the plurality of continuous strips 102 and the cut and creased continuous strip 90a. As described above, the continuous strip 106 of a relatively flexible fluid impervious material contacts the continuous strip 90a of a relatively rigid material and the continuous strips 104 of a relatively flexible material at a location spaced about one inch before the nip 64. It is noted that in all instances the guiding surfaces of the guide apparatus 65 and 66 of FIG. 1 and of the guide apparatus 100, 104 and 108 of FIG. 2 are all located spaced from one side of the plane 68 in FIG. 1 and the plane 110 in FIG. 2 so that the continuous strips of material all enter the nip from one side of the plane tangent to the laminating rolls at the nip while in contacting relationship as described above. The laminated product, illustrated in FIG. 5, then passes through the cutting rolls 70 and 72 to cut the strip of a relatively flexible, fluid impervious material 106 and the continuous strip of a relative flexible material 126 secured thereto to form two laminated products which then pass between the cutting rolls 74 and 76 which cut the cut lines 18 between the glue tab 20 of one carton blank and the side panel 22 of the preceding carton blank. After being cut, the carton blanks 112 are fed into conventional inverting apparatus (not shown) which inverts the carton blanks 112 so that the upper surfaces of the carton blanks 112 on the platform 82 comprise the relatively flexible, fluid impervious material 106.

As described above, in some instances, depending on the thickness and quality of the continuous strip of a relatively rigid material 90, the cutting and creasing rolls 92 and 94 do not remove the cut scrap material 96. In those instances, rolls 116 and 118 remove the cut scrap material 96 and a vacuum manifold 120 removes the cut scrap material 96 from the roll 118.

Figure 4:
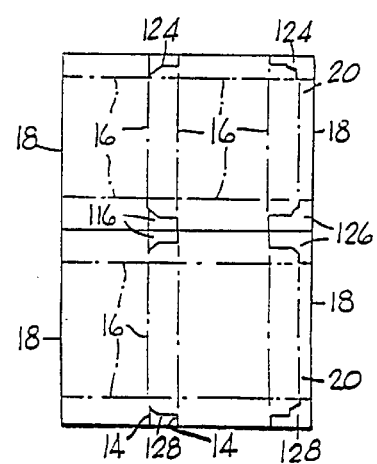
FIG. 4 is a bottom plan view of two individual carton blanks.
Figures 5, 6:
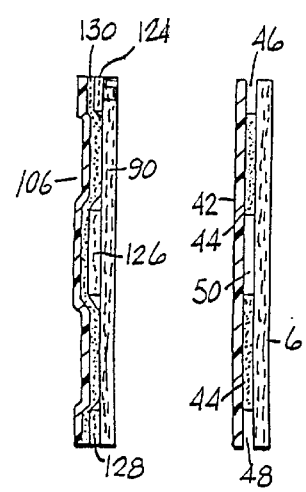
FIG. 5 is a cross-sectional view of one embodiment of a carton blank.
FIG. 6 is a cross-sectional view of another embodiment of a carton blank.

The carton blank 112 illustrated in FIGS. 4 and 5 comprises a laminate of the relatively rigid material 90, the plurality of spaced apart relative narrow strips of a relatively flexible material 124, 126 and 128, which are not secured to the relatively rigid material 90, and an adhesive coating 130 that secures the spaced apart relative narrow continuous strips of a relatively flexible material 124, 126 and 128 to portions of the relatively flexible, fluid impervious material 106 and other portions of the relatively flexible fluid impervious material 106 to portions of the relatively rigid material 90. The strip 126 is twice as wide as the strips 124 and 128 so that two carton blanks 112 can be formed. The continuous strips 124, 126 and 128 may be formed from a Kraft paper or other materials having similar characteristics.

In FIG. 7, another embodiment of apparatus 202 for carrying out the inventive concepts of this application is schematically illustrated. The apparatus 202 comprises a roll 204 of a relatively rigid material mounted so that a continuous strip 206 may be pulled therefrom. The continuous strip 206 is pulled through straightening apparatus 208 by pull rolls 210. The continuous strip 206 of the relatively rigid material then moves through the rotating cutting and creasing apparatus 212 wherein cut lines 14 and fold lines 16, similar to FIG. 3, are formed therein. As described above, although the rotating cutting and creasing apparatus apply some pulling force, the primary pulling force moving the continuous strip of a relatively rigid material through the cutting and creasing apparatus 212 is the pulling force of the laminating rolls described below. The cut line 18, illustrated as a phantom line in FIG. 3, is not illustrated in FIGS. 8 and 9 since, as described above, it is not made at this time. As illustrated in FIG. 9, the cut lines 14 leave a first portion 214 of scrap material and a second portion 216 of scrap material. Also, as illustrated in FIGS. 8 and 9, the cut lines 14 leave scrap edge portions 218 and 220. As illustrated in FIGS. 8 and 9, two carton blanks 4a and 4b are being formed and the continuous strip 6 has opposite edge portions 222 and 224. The cut lines 14 adjacent to the edge portions 222 and 224 have small notch portions (not shown) removably retaining the edge portions 218 and 220 to the carton blanks 4a and 4b. If the cut lines 18 were made in the continuous strip 206 of a relatively rigid material, the notch portions would not have sufficient strength to retain the continuity of the continuous strip 206 of a relatively rigid material so that it can be pulled through the laminating rolls as described below. The cut lines 14 between the scrap portions 214 and 216 and the carton blanks 4b have small notch portions 226, FIG. 9a, removably retaining the scrap portions 214 and 216 to the carton blanks 4b so that the scrap portions 214 and 216 may be removed from the carton blanks 4b as described below.

Three rolls 230, 232, 234 of a relatively flexible material, such as the Kraft paper described above, are mounted so that relatively narrow continuous strips 236, 238 and 240 may be pulled therefrom in response to the pulling force of the laminating rolls, as described below. The three rolls 230, 232 and 234 are mounted in a conventional apparatus having braking means and straightening means associated therewith. The continuous strips 236, 238 and 240 are guided into a superposed relationship with the carton blanks 4a and 4b by the guide rolls 242.

The continuous strip 206 of a relatively rigid material and the continuous strips of a relatively narrow flexible material 236, 238 and 240 are pulled through a hot melt adhesive applying apparatus 244 by the laminating rolls (described below) wherein portions of the continuous strip 206 of a relatively rigid material and the continuous strips 236, 238 an 240 of a relatively narrow flexible material are coated with a hot melt adhesive that is tacky at temperatures of between about 300° F. and 400° F. If the carton blanks being produced do not require the continuous strips 236, 238 and 240, then only the continuous strip 206 of a relatively rigid material passes through the hot melt adhesive applying apparatus 244.

A roll 250 of a relatively flexible fluid impervious material, as described above, is mounted so that a continuous strip 252 may be pulled therefrom in response to the pulling force exerted thereon by the laminating rolls, as described below. The mounting apparatus for the roll 250 is similar to the mounting apparatus for the rolls 230, 232 and 234.

The continuous strip 252 of a relatively flexible material and the adhesive coated continuous strip 206 of a relatively rigid material are pulled through the laminating rolls 256 and 258, which rolls are similar to the rolls 60 and 62. The laminating rolls 256 and 258 function similarly to the laminating rolls 60 and 62 in that they provide the primary pulling force to move the continuous strip 206 of the relatively rigid material from the pull rolls 210 through the cutting and creasing rolls 212 and the hot melt adhesive applying apparatus 244; the continuous strips 236, 238 and 240 of a relatively flexible material from the rolls 230, 232, and 234 and the continuous strip 252 of a relatively flexible fluid impervious material from the roll 250 and then through the laminating rolls 256 and 258 to form the laminated product. As described above, the laminating rolls 256 and 258 are rotated at a velocity sufficient to move the continuous strip 252 of a relatively flexible fluid impervious material and the continuous strip 206 of a relatively rigid material at a velocity between about 700 to 1000 feet per minute. Since the distance between the hot melt adhesive applying apparatus 244 and the laminating rolls 256 and 258 is relatively small, the hot melt adhesive substantially retains its temperature. If the continuous strips 236, 238 and 240 have been superposed on the continuous strip 206, they also move between the laminating rolls 256 and 258. If has been found that when a hot melt adhesive is applied, the curling problem does not exist. If the curling problem does arise, the continuous strips 206, 236, 238, 240 and 252 are fed to the nip between the laminating rolls 256 and 258 as described above. The laminating rolls 256 and 258 function to secure together the adhesive coated portions of the continuous strips 206 and, when used, the continuous strips 236, 238 and 240 to portions of the continuous strip 252. Carton blanks 4a and 4b formed without the continuous strips 236, 238 and 240 are illustrated in FIG. 6 and carton blanks 4a and 4b formed with the continuous strips 236, and 238 and 240 are illustrated in FIG. 5.

The laminated product leaving the laminating rolls 256 and 258 is pulled between cutting apparatus 260 which cuts the portion of the continuous strip 252 or the portions of the continuous strips 252 and 238 superposed over the centerline 262 but does not cut the scrap portions 214 and 216.

The laminated product then passes through cutting apparatus 264 which makes the cut lines 18 to divide the laminated product into carton blanks 4a and 4b. The cutting apparatus 264 and conventional nip rolls associated therewith provides the force to move the laminated product through the cutting apparatus 260 and 264 and the carton blanks 4a and 4b onto a first moving conveyor 270.

The first moving conveyor 270 has a reach 272 and a reach 274 which are located to have portions thereof in contact with the carton blanks 4a and 4b as illustrated in FIG. 10. The first moving conveyor 270 moves at a velocity greater than the velocity at which the carton blank 4a and 4b are discharged from the cutting apparatus 264 so that the carton blanks 4a and 4b are in a spaced apart relationship on the first moving conveyor 270 as illustrated in FIG. 11 wherein the reach 272 has been removed. The cut lines and fold lines are not illustrated in the carton blanks of FIGS. 11–14. The first moving conveyor 270 lies generally in a horizontal plane and has conventional apparatus 276 for providing its movement. Scrap removing apparatus (not shown) is located in the cutting apparatus 264 to remove the scrap edge portions 218 and 220.

A second moving conveyor 280 has a reach 282 and a reach 284 which are located to have portions thereof in contact with the carton blanks 4a. The second moving conveyor 280 moves at substantially the same velocity as the first moving conveyor 270. The second moving conveyor 280 lies in a plane inclined upwardly from the first moving conveyor 270 so that when a carton blank 4a moves from the first moving conveyor 270 to the second moving conveyor 280, the carton blank 4a moves from a location adjacent to the carton blank 4b. The second endless moving conveyor 280 has conventional apparatus 286 and 288 for providing its movement.

A third moving conveyor 290 has a reach 292 and a reach 294 which are located to have portions thereof in contact with the carton blanks 4b. The third endless moving conveyor moves at a velocity substantially the same as the velocity of the first 270 and second 280 endless moving conveyors. The third moving conveyor 290 lies in a plane inclined downwardly from the first endless moving conveyor 270 so that when the carton blank 4b moves from the first moving conveyor 270 to the third moving conveyor 290, the carton blank 4b moves from a location adjacent to the carton blank 4a. The third moving conveyor 290 has conventional apparatus 296 and 298 for providing its movement.

Figure 12:
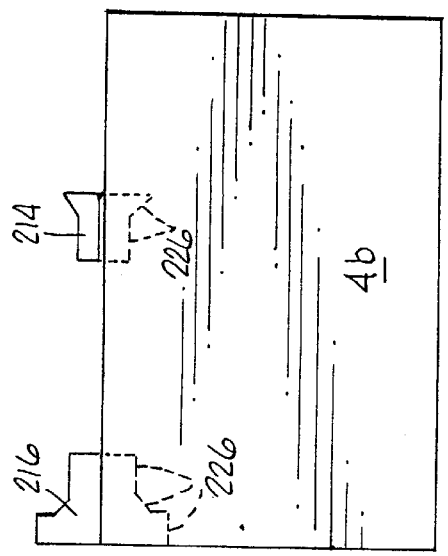
FIG. 12 is a top plan view of a carton blank prior to the removal of the scrap materials.
Figure 13:
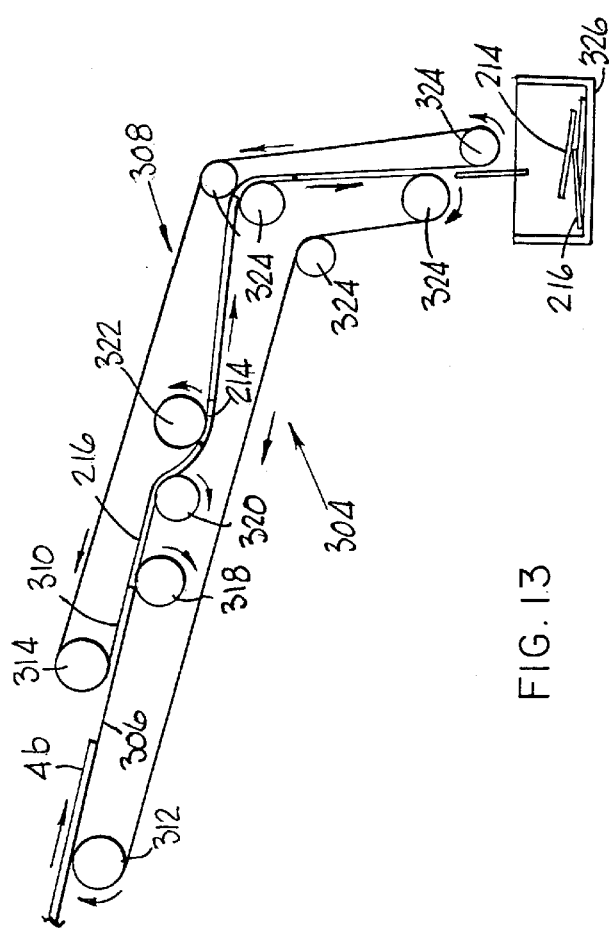
FIG. 13 is a schematic side elevational view of a scrap removing apparatus.
Figure 14:
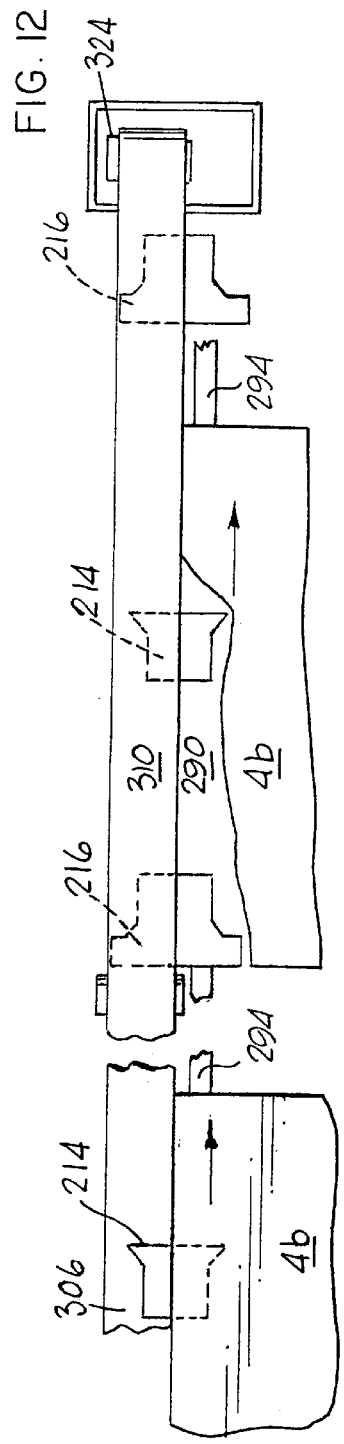
FIG. 14 is a schematic top plan view illustrating the removal of the scrap materials.

Scrap removal apparatus 302, FIG. 11, is illustrated generally in FIGS. 7 and 11 and more specifically in FIGS. 12–14. In FIG. 12, there is illustrated the carton blank 4b as it moves onto the third moving conveyor 290. As the carton blanks 4a and 4b are separated by the second 280 and third 290 moving conveyors, the scrap portions 214 and 216 move with the blank 4b because of the notch portions 226.

The scrap removal apparatus 302 is illustrated in FIGS. 13 and 14 and includes a fourth moving conveyor 304 having a reach 306 and a fifth moving conveyor 308 having a reach 310 which reaches are located so that portions thereof contact and remove the scrap portions 214 and 216 as described below. Portions of the fourth 304 and fifth 308 moving conveyors are guided for movement over rolls 312, 314, 318, 320, 322 and 324. The reaches 306 and 310 between the rolls 312 and 320 move in the same planes as the reaches 292 and 294 of the third moving conveyor 290. As illustrated in FIG. 14, the portions of the scrap portions 214 and 216 projecting outwardly from the carton blanks 4b are located above the reach 306 and then move between the reaches 306 and 310 and are held securely therebetween. As the reaches 306 and 310 move between the rolls 320 and 322, the reaches 306 and 310 are moved downwardly to separate the scrap portions 214 and 216 from the carton blanks 4b. The fourth 304 and fifth 308 moving conveyors carrying the removed scrap portions 214 and 216 move around the remaining rolls 324 located so that the removed scrap portions 214 and 216 are deposited in scrap removal apparatus 326.

The carton blanks 4a move from the second moving conveyor 280 onto a collection conveyor 328, FIG. 10, and the carton blanks 4b move from the third moving conveyor 290 onto a collection conveyor 330.

Figure 15:
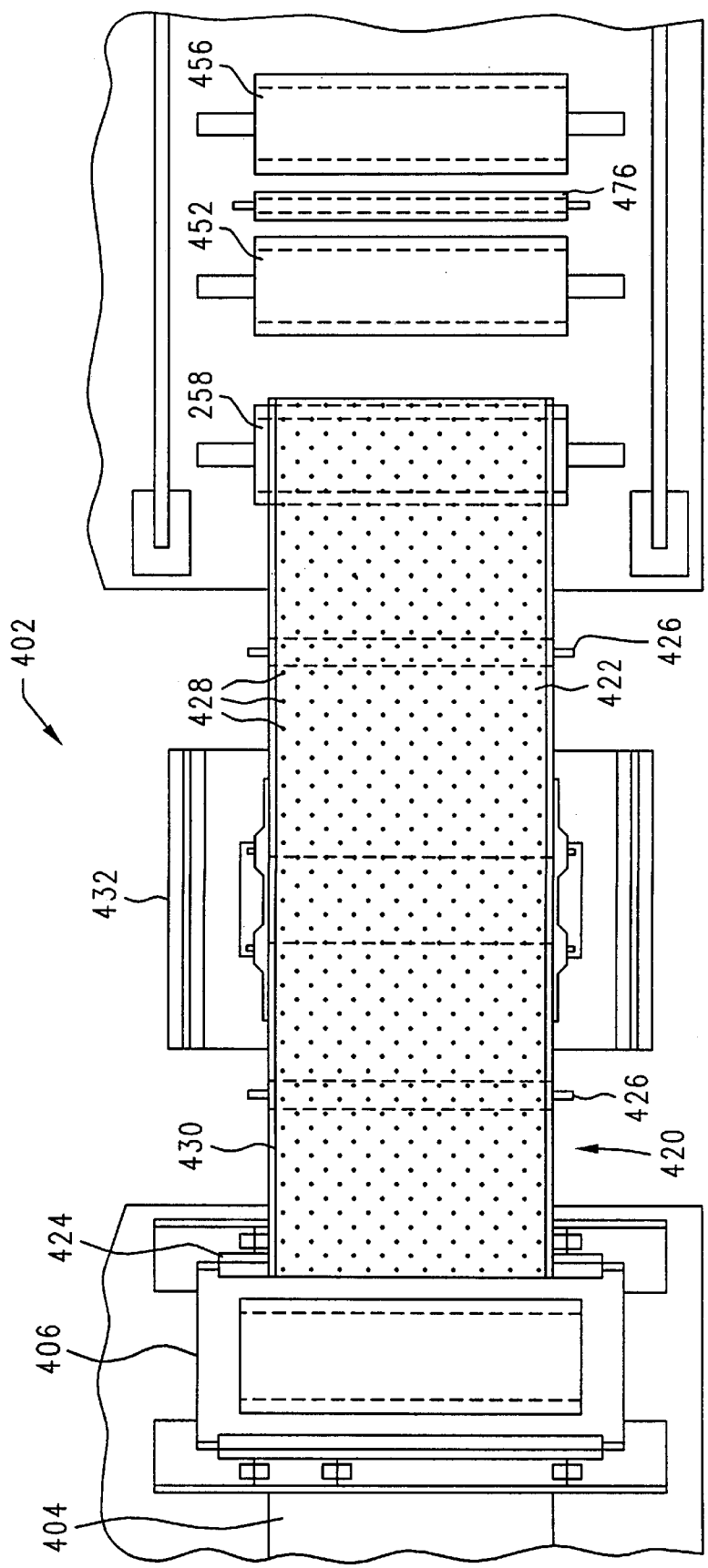
FIG. 15 is a schematic top plan view with parts removed of another embodiment of the invention.
Figure 16:
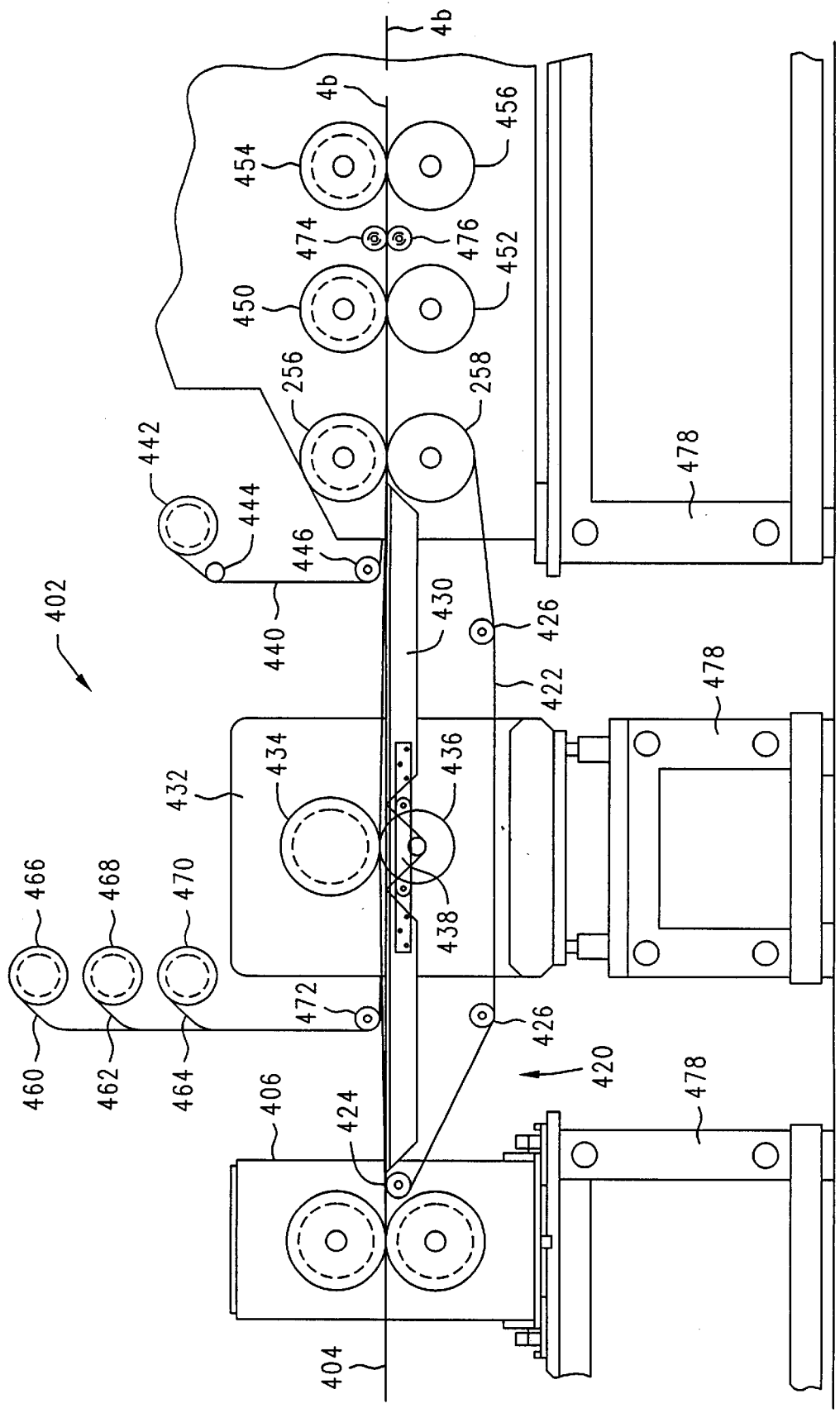
FIG. 16 is a schematic side elevational view with parts removed of the embodiment of the invention of FIG. 15.

In FIGS. 15 and 16, there is illustrated another embodiment of apparatus 402 of this invention. A continuous strip 404 of a relatively rigid material, similar to the continuous strip 206 of a relatively rigid material, is illustrated as having passed through the pull rolls 210 and is entering the rotary cutting and creasing apparatus 406 similar to the rotary cutting and creasing apparatus 212. The configuration of the continuous strip 404 of the relatively rigid material leaving the rotary cutting and creasing apparatus 406 is similar to that illustrated in FIG. 8 so that the same reference numerals in FIG. 8 have been used in FIG. 17. The carton blank 4a or 4b of FIG. 17 differs from those in FIG. 8 in that the cut line 18 between the leading edge 408 of one carton blank 4a or 4b and the trailing edge 410 of the next preceding carton blank 4a or 4b is made. As described above, all of the cut lines 14 and 18 have small notch portions 226, illustrated in FIG. 9A, between the adjacent portions of the carton blank 4a or 4b and the edge portions 222 and 224. These notch portions 226 are readily frangible and do not have sufficient strength to retain the continuity of the continuous strip 404 of a relatively rigid material when subjected to the pulling force exerted by the two rotating laminating rolls 256 and 258.

Since all of the cut lines and fold lines for the individual carton blanks 4a or 4b are formed in continuous strip 404 of a relatively rigid material in this embodiment of the invention, holding apparatus 420 is provided to support and move, the continuous strip 404 of a relatively rigid material which has been cut into individual carton blanks 4a and 4b from the rotary cutting and creasing apparatus 406 to the two laminating rolls 256 and 258. In a preferred embodiment of the invention, the holding apparatus 420 comprises a continuous conveyor belt 422 that is trained around an idler roll 424 and the laminating roll 258 which provides the force to move the conveyor belt 422. Tension applying rolls 426 maintain the proper tension in the conveyor belt 422. A plurality of openings 428 are formed in the conveyor belt 428. A vacuum forming apparatus 430 extends from a location adjacent to the idler roll 424 to a location adjacent to the laminating roll 258. The conveyor belt 422 passes over the vacuum forming apparatus 430 so that a downward force is exerted on the plurality of individual carton blanks 4a and 4b to hold them in position on the conveyor belt 404 so as to have exposed surfaces. As illustrated in FIG. 17, the continuous strip 404 of a relatively rigid material has a cross machine dimension that permits the formation of two adjacent carton blanks 4a and 4b. It is understood that this is for illustration purposes only and one or more than two carton blanks may be formed in the cross machine direction. Also, the conveyor belt 422 is illustrated as being journaled around the laminating roll 258. This is preferred when more than two relatively small carton blanks in a cross machine direction are being formed. If the carton blank or blanks are large enough, the conveyor belt 422 may be trained around a driving roll (not shown) located adjacent to the laminating roll 258.

The conveyor belt 422 with the plurality of individual carton blanks 4a and 4b thereon moves through an adhesive applying apparatus 432 having an upper roll 434 having an adhesive coating material thereon and a lower roll 436. As the plurality of individually carton blanks 4a and 4b pass between the upper and lower rolls 434 and 436, an adhesive coating material is applied to at least portions of the central body portion, as explained above, of each of the plurality of individual carton blanks 4a and 4b. The central body portion is that portion of the carton blanks 4a and 4b located between but spaced from the fold lines between the sidewall panels and the top and bottom panels thereof. In a preferred embodiment of the invention the adhesive coating material is a hot melt adhesive, as described above. It is noted that one of the upper or lower rolls 434 and 436 is mounted for movement away from the other in the event that the conveyor 422 is stopped so that the adhesive on the upper roll 434 does not dry out. In the embodiment illustrated in FIG. 16, the lower roll 436 is moved by conventional apparatus 438.

The two rotating laminating rolls 256 and 258 exert a pulling force on a continuous strip 440 of a relatively flexible fluid impervious material to pull such continuous strip 440 from a supply 442, over a tension apparatus 444 and a guide apparatus 446 to be superposed over the continuous strip 404 of a relatively rigid material having the plurality of individual cartons 4*a* and 4*b* formed therein. As the continuous strips 404 and 440 pass through the two rotating laminating rolls 256 and 258, the portions of the continuous strip 440 of a relatively flexible fluid impervious member overlying the central body portions of the plurality of individual carton blanks 4*a* and 4*b* are secured to each other to form a laminated product.

The laminated product then moves between the slitter rolls 450 and 452 which cut the portion of the continuous strip 440 of a relatively flexible fluid impervious material overlying the center cut line 14 between the plurality of individual carton blanks 4*a* and 4*b* but do not cut the scrap portions 214 and 216. If desired, the slitter rolls 450 and 452 also continuously cut the portions of the continuous strip 440 of a relatively flexible fluid impervious material overlying the cut portions 14 defining the edge portions of the top and bottom panels.

The laminated product then passes between the cutting rolls 454 and 456 which makes a cross machine direction cut only of the continuous strip 440 of a relatively flexible fluid impervious material. The movements of the various portions of the apparatus are controlled by conventional apparatus (not shown) so that the continuous strip 440 of a relatively flexible fluid impervious material is cut either at a location directly above the leading edges 408 of the individual carton blanks 4*a* and 4*b* or at a location spaced from the leading edges 408. If the cut is made at the location spaced from the leading edge, when adjacent carton blank 4*a* and 4*a* or 4*b* and 4*b* in the machine direction are separated, as described above, portions of one of the sidewall, top and bottom panels of the carton blanks 4*a* and 4*b* are exposed and portions of the continuous strip 440 of a relatively flexible fluid impervious material extend rearwardly from the trailing edge 410 of the preceding carton blanks 4*a* and 4*b* in the machine direction. Scrap removing apparatus (not shown) is located adjacent to each end of the cutting rolls 454 and 456 to remove the scrap edge portions 218 and 220 and the cut away portion of the continuous strip 440.

In another preferred embodiment of the invention, the two laminating rolls 256 and 258 exert a pulling force on a plurality of continuous strips 460, 462 and 464, which are in a spaced apart relationship to pull them from supply rolls 466, 468 and 470. The three rolls 466, 468 and 470 are mounted in conventional apparatus having braking apparatus and straightening apparatus associated therewith. The spaced apart continuous strips 460, 462 and 464 of a relatively flexible material are guided into a superposed relationship with the continuous strip 404 and the carton blanks 4*a* and 4*b* by conventional guide apparatus 472 prior to the adhesive applying apparatus 432. The middle continuous strip 462 has a dimension in the cross machine direction that is twice the dimension of each of the other continuous strips 460 and 464 in the cross machine direction. The continuous strips 460, 462 and 464 of a relatively flexible material move with the carton blanks 4*a* and 4*b* through the adhesive applying apparatus 432 so that an adhesive coating material is deposited on the upper exposed surfaces of the continuous strips 460, 462 and 464 of a relatively flexible material by the adhesive applying roll 434. The continuous strip 440 of a relatively flexible fluid impervious material is then superposed over the adhesive coated spaced apart continuous strips 460, 462 and 464 of a relatively flexible material and the continuous strip 404 of a relatively rigid material with the adhesive coated individual carton blanks 4*a* and 4*b* and all pass between the two rotating laminating rolls 256 and 258 to form a laminated product.

The laminated product then moves between the slitter rolls 450 and 452 which cut the portion of the continuous strip 440 and the portion of the continuous strip 462 overlying the center cut line 14 between the plurality of individual carton blanks 4*a* and 4*b* but does not cut the scrap portions 214 and 216. If desired, the slitter rolls 450 and 452 also continuously cut the portions of the continuous strip 440 of a relatively flexible fluid impervious material overlying the cut portions 14 defining the edge portions of the top and bottom panels.

The laminated product then passes between the cutting rolls 454 and 456 which makes a cross machine direction cut of the continuous sheet 440 of a relatively flexible fluid impervious material and spaced apart continuous strips 460, 462 and 464 of a relatively flexible material. As described above, the movements of the various portions of the apparatus are controlled by conventional apparatus (not shown) so that the continuous strip 440 of a relatively flexible fluid impervious material and the spaced apart continuous strips 460, 462 and 464 are cut either at a location directly above the leading edges 408 of the individual carton blanks 4*a* and 4*b* or at a location spaced from the leading edges 408 of the individual carton blanks 4*a* and 4*b*. If the cut is made at the location spaced from the leading edge, when adjacent carton blanks 4*a* and 4*a* or 4*b* and 4*b* in the machine direction, are separated, as described above, portions of one of the sidewall, top and bottom panels of the carton blanks 4*a* and 4*b* are exposed and portions of the spaced apart continuous strips 460 and 462 or 462 and 464 and portions of the continuous strip 440 extend rearwardly from the preceding carton blanks 4*a* and 4*b* in the machine direction. If necessary, force applying pull rolls 474 and 476 are provided to pull the laminated product from the two rotating laminating rolls 256 and 258 through the slitter rolls 450 and 456 and into the cutting rolls 454 and 456. The individual carton blanks 4*a* and 4*b* move into the conveyor 270, as described above, to move with the conveyor 270 in a spaced apart relationship. Conventional support apparatus 478 is provided to support the various portions of the apparatus.

A carton blank 4*a* formed by one of the above described embodiments of this invention is illustrated in FIGS. 18–20. As illustrated in FIG. 19, the laminate comprises an outer layer 482 of a relatively rigid material, an inner layer 484 of a relatively flexible fluid impervious material and an intermediate layer 486 comprising two spaced apart strips of a relatively flexible material. The intermediate layer 486 is joined to the outer edge portions of the inner layer 484 by a suitable adhesive 496 and the central portion of the inner layer 484 is secured to the central body portion of the outer layer 482 by the same adhesive 496 which adhesive 496, as described above, is preferably a hot melt adhesive. The outer layer has cut and fold lines 14 and 18, described above, to divide the outer layer 482 into a plurality of integral sidewall panels 488 joined together by the fold lines 16 and an integral glue tab panel 490 joined to one of the sidewall panels 488 by a fold line 16. A plurality of top panels 492 and a plurality of bottom panels 494 are integral with the sidewall panels 488 and joined together by fold lines 16. As illustrated in FIG. 18, the inner layer 484 and the intermediate layer 486 have been cut at a distance spaced from the leading edge 408 so as to leave portions of a top panel 492, a sidewall panel 488 and a portion of a bottom panel 494 exposed. As illustrated in FIG. 20, portions of the inner layer 484 and the intermediate layer 486 extend rearwardly from the trailing edge 410 of the glue tab panel 490. The carton blank 4*a* of FIGS. 18–20 can then be folded into an open ended carton having a secured together joint as illustrated in FIG. 21 (rotated ninety degrees). The joint comprises the glue tab panel 490 and the portion of the inner layer 484 secured thereto and a portion of a sidewall panel 488 and the portion of the inner layer 484. This arrangement permits the portions of the inner layer 484 to be secured together by a hot melt adhesive 498 and the portions of the glue tab panel 490 and the sidewall panel 488 to be secured together by a cold adhesive 500.

While illustrative and presently preferred embodiments of the invention have been described in detail herein, it is to be understood that the inventive concept may be otherwise variously embodied and employed and that the appended claims are intended to be construed to include such variations except insofar as limited by the prior art.

What is claimed:

1. A method for forming carton blanks wherein each carton blank has a plurality of sidewall panels integral with and joined to a plurality of top wall panels by fold lines and integral with and joined to a plurality of bottom wall panels and a glue tab panel integral with and joined to one of the sidewall panels by a fold line so that each carton blank has a central body portion extending between but spaced from said fold lines and extending into the glue tab panel comprising:

pulling a continuous strip of a relatively rigid material from a supply of said relatively rigid material;

passing said continuous strip through a rotary cutting and creasing apparatus;

cutting and creasing said continuous strip of a relatively rigid material into a plurality of individual carton blanks with each individual carton blanks having all the cut lines and fold lines required therein;

feeding said continuous strip of a relatively rigid material with said plurality of individual carton blanks formed therein onto a moving conveyor so that each individual carton blank has a leading edge and a trailing edge;

holding adjacent individual carton blanks of said plurality of individual carton blanks in a contacting relationship with said moving conveyor to provide an exposed surface;

applying an adhesive coating material to at least portions of the exposed surfaces of said central body portions of said plurality of individual carton blanks on said moving conveyor;

feeding said plurality of individual carton blanks from said moving conveyor into a nip between laminating rolls;

moving a continuous strip of a relatively flexible fluid impervious material into said nip and in a superposed relationship with said plurality of individual carton blanks and with said adhesive coating material on said central body portions of said plurality of individual carton blanks so that a central portion of said continuous strip of a relatively flexible fluid impervious material is superposed over said central body portions;

securing together said central body portions and said central portion; and cutting said continuous strip of a relatively flexible fluid impervious material to form laminated individual carton blanks.

2. A method as in claim 1 and further comprising:

cutting only said continuous strip of a relatively flexible fluid impervious material at a location spaced from the leading edge of each of said plurality of individual carton blanks; and separating adjacent carton blanks in the machine direction to expose a portion of one of said sidewall, top and bottom panels of each of said plurality of individual carton blanks adjacent to said leading edge.

3. A method as in claim 1 and further comprising:

controlling said cutting of said continuous strip of a relatively rigid material so that the trailing edge of one of said individual carton blanks is connected to the leading edge of the next individual carton blanks by a plurality of small, readily frangible notches of said continuous strip of a relatively rigid material.

4. A method as in claim 3 wherein said holding step comprises:

providing said moving conveyor with a plurality of spaced apart openings formed therein; and applying a vacuum to said moving conveyor through said spaced apart openings to hold said individual carton blanks in said contacting relationship therewith.

5. A method as in claim 1 and further comprising:

moving a plurality of spaced apart, relatively narrow continuous strips of a relatively flexible material into a superposed contacting relationship with spaced apart portions of said exposed surface of said plurality of individual carton blanks outside of said central body portions so that said plurality of spaced apart, relatively narrow continuous strips of a relatively flexible material have exposed surfaces;

applying adhesive coating material to said exposed surfaces of said plurality of spaced apart relatively narrow continuous strips of a relatively flexible material;

feeding said plurality of spaced apart, relatively narrow continuous strips of a relatively flexible material with said plurality of individual carton blanks so that spaced apart portions of said continuous strip of a relatively flexible fluid impervious material are secured to said individual carton blanks; and also cutting said plurality of spaced apart relatively narrow continuous strips of a relatively flexible material to form said laminated individual carton blanks.

6. A method as in claim 5 wherein said holding step comprises:

providing said moving conveyor with a plurality of spaced apart openings formed therein; and applying a vacuum to said moving conveyor through said spaced apart openings to hold said individual carton blanks in said contacting relationship therewith.

7. A method as in claim 5 and further comprising:

cutting said continuous strip of a relatively flexible fluid impervious material and said plurality of spaced apart, relatively narrow continuous strips of a relatively flexible material at a location spaced from the leading edge of each of said plurality of individual carton blanks; and separating adjacent carton blanks in the machine direction so that portions of one of said sidewall, top and bottom panels of each of said plurality of individual carton blanks adjacent to said leading edge are exposed and portions of said continuous strip of a relatively flexible fluid impervious material and portion of said spaced apart continuous strips of a relatively flexible material extend rearwardly from the trailing edge of individual carton blanks.

8. A method as in claim 7 wherein said holding step comprises:

providing said moving conveyor with a plurality of spaced apart openings formed therein; and applying a vacuum to said moving conveyor to hold said individual carton blanks in said contacting relationship therewith.

9. A method as in claim 1 wherein said holding step comprises:

controlling said cutting of said continuous strip of a relatively rigid material so that the trailing edge of one of said individual carton blanks in connected to the leading edge of the next individual carton blanks by a plurality of small, readily frangible notches of said continuous strip of a relatively rigid material.

10. A method as in claim 9 and further comprising:

cutting only said continuous strip of a relatively flexible fluid impervious material at a location spaced from the leading edge of each of said plurality of individual carton blanks; and separating adjacent carton blanks in the machine direction so that a portion of one of said sidewall, top and bottom panels of each of said plurality of individual carton blanks adjacent to said leading edge are exposed and portions of said continuous strip of a relatively flexible fluid impervious material and portion of said spaced apart continuous strips of a relatively flexible material extend rearwardly from the trailing edge of individual carton blanks.

11. Apparatus for use in forming carton blanks comprising:

rotary cutting and creasing apparatus mounted at a fixed location;

moving apparatus for moving a continuous strip of a relatively rigid material into said rotary cutting and creasing apparatus so that said rotary cutting and creasing apparatus forms a plurality of individual carton blanks each having a leading edge and a trailing edge;

a first laminating roll mounted at a fixed location;

a second laminating roll mounted adjacent to said first laminating roll so as to form a nip therebetween;

drive apparatus for rotating at least one of said first and second laminating rolls so as to rotate both of said first and second laminating rolls;

another moving apparatus for moving said plurality of individual carton blanks into said nip;

said first and second laminating rolls pulling a continuous strip of a relatively flexible fluid impervious material from a supply thereof;

guide apparatus for guiding said continuous strip of a relatively flexible, fluid impervious material into said nip so that said plurality of individual carton blanks and said continuous strip of a relatively flexible, fluid impervious material have facing surfaces;

apparatus for applying an adhesive coating material on at least portions of one of said facing surfaces;

said first and second laminating rolls applying sufficient force on said plurality of individual carton blanks and said continuous strip of a relatively flexible material at said nip so as to laminate said plurality of individual carton blanks and said continuous strip of a relatively flexible fluid impervious material together;

said rotary cutting and creasing apparatus being located before said first and second laminating rolls; and cutting apparatus for cutting said continuous strip of a relatively flexible fluid impervious material to form laminated individual carton blanks.

12. Apparatus as in claim 11 wherein said another moving apparatus comprises:

a vacuum conveyor for supporting and moving said plurality of individual carton blanks.

13. Apparatus as in claim 12 wherein:

said plurality of individual carton blanks being supported on said vacuum conveyor to have exposed surfaces; and said adhesive applying apparatus applying said adhesive coating material to at least portions of said exposed surfaces.

14. Apparatus for use in forming carton blanks comprising:

rotary cutting and creasing apparatus mounted at a fixed location;

moving apparatus for moving a continuous strip of a relatively rigid material into said rotary cutting and creasing apparatus so that said rotary cutting and creasing apparatus forms a plurality of individual carton blanks each having a leading edge and a trailing edge;

a first laminating roll mounted at a fixed location;

a second laminating roll mounted adjacent to said first laminating roll so as to form a nip therebetween;

drive apparatus for rotating at least one of said first and second laminating rolls so as to rotate both of said first and second laminating rolls;

another moving apparatus for moving said plurality of individual carton blanks into said nip;

said first and second laminating rolls pulling a plurality of spaced apart relatively narrow continuous strips of a relatively flexible material from supplies thereof from;

at least a first guide apparatus for guiding said plurality of spaced apart, relatively narrow continuous strips of a relatively flexible material into said nip to cover spaced apart portions of said plurality of individual carton blanks;

at least a second guide apparatus for guiding a continuous strip of a relatively flexible, fluid impervious material into said nip so that said plurality of individual carton blanks, said plurality of spaced apart, relatively narrow continuous strips of a relatively flexible material and said continuous strip of a relatively flexible fluid impervious material have facing surfaces;

at least portions of said facing surfaces having an adhesive coating thereon;

said first and second laminating rolls applying sufficient force on said plurality of individual carton blanks, said plurality of spaced apart, relatively narrow continuous strips of a relatively flexible material and said continuous strip of a relatively flexible, fluid impervious material at said nip so as to laminate portions of said plurality of individual carton blanks to portions of said continuous strip of a relatively flexible, fluid impervious material together and at least portions of said plurality of spaced apart, relatively narrow continuous strips of a relatively flexible material to other portions of said continuous strip of a relatively flexible, fluid impervious material together;

said rotary cutting and creasing apparatus being located before said first and second laminating rolls; and cutting apparatus for cutting said continuous strip of a relatively flexible fluid impervious material and said spaced apart relatively narrow continuous strips of a relatively flexible material to form laminated individual carton blanks.

15. Apparatus as in claim 14 and further comprising:

said continuous strip of a relatively rigid material having a linear extent in a cross-machine direction so that at least two individual carton blanks are in a side by side relationship;

said at least two individual carton blanks having a centerline therebetween;

said continuous strip of a relatively flexible fluid impervious material having a linear extent in a cross-machine direction that corresponds to said linear extent of said continuous strip of a relatively rigid material so that at least a portion of said continuous strip of a relatively flexible fluid impervious material overlies said centerline;

at least a portion of one of said plurality of spaced apart, relatively narrow continuous strips of a relatively flexible material overlying said centerline; and additional cutting apparatus for cutting said continuous strip of a relatively flexible fluid impervious material and said one of said plurality of spaced apart, relatively narrow continuous strips of a relatively flexible material overlying said centerline.

16. Apparatus as in claim 15 said further comprising:

said cut lines defining at least one portion of scrap material located between said at least two individual carton blanks;

at least a portion of said at least one portion of scrap material being at least removably secured to only one of said at least two individual carton blanks; and scrap removing apparatus for removing said at least one portion of scrap material.

17. Apparatus as in claim 15 wherein said moving apparatus comprises:

a vacuum conveyor for supporting and moving said plurality of individual carton blanks.

18. Apparatus as in claim 17 wherein:

said plurality of individual carton blanks being supported on said vacuum conveyor to have exposed surfaces; and said adhesive applying apparatus applying said adhesive coating material to at least portions of said exposed surfaces.

19. Apparatus as in claim 18 and further comprising:

said cutting apparatus cutting only said spaced apart relatively narrow continuous strips of a relatively flexible material and said continuous strip of a relatively flexible fluid impervious material at locations spaced from said leading edges of said laminated individual carton blank.

* * * * *

UNITED STATES PATENT AND TRADEMARK OFFICE
CERTIFICATE OF CORRECTION

PATENT NO.    : 6,221,192 B1
DATED         : April 24, 2001
INVENTOR(S)   : Joseph C. Walsh It is certified that error appears in the above-identified patent and that said Letters Patent is hereby corrected as shown below:

<u>Column 9,</u>
Line 32, delete "It" and insert therefor -- it --.

<u>Column 11,</u>
Line 50, delete "an" and insert therefor -- and --.

<u>Column 12,</u>
Line 21, delete "If" and insert therefor -- It --.

<u>Column 20,</u>
Line 32, after "thereof" delete "from".

Signed and Sealed this

Second Day of April, 2002

*Attest:*

JAMES E. ROGAN
*Attesting Officer*         *Director of the United States Patent and Trademark Office*

UNITED STATES PATENT AND TRADEMARK OFFICE
CERTIFICATE OF CORRECTION

PATENT NO. : 6,221,192 B1
DATED : April 24, 2001
INVENTOR(S) : Joseph C. Walsh

It is certified that error appears in the above-identified patent and that said Letters Patent is hereby corrected as shown below:

<u>Title page,</u>
After Item [73], Assignee: delete "Coors Brewing Company, Golden, CO" and insert therefor -- Graphic Packaging Corporation, Paoli, PA --

Signed and Sealed this

Second Day of July, 2002

*Attest:*

*Attesting Officer*

JAMES E. ROGAN
*Director of the United States Patent and Trademark Office*